No. 627,948. Patented June 27, 1899.
H. N. WOOD.
AUTOMATIC BRAKE BLOCK.
(Application filed Jan. 13, 1899.)
(No Model.)
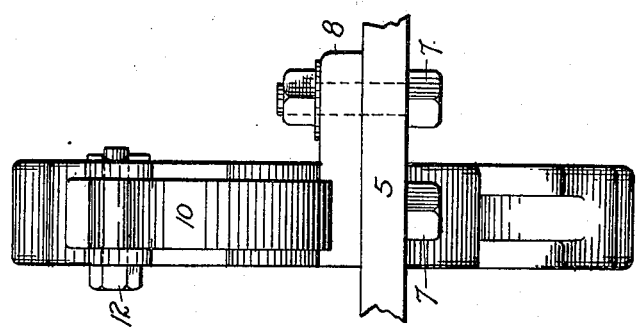
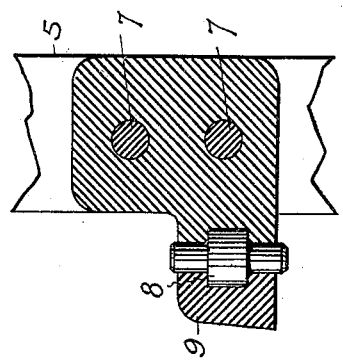
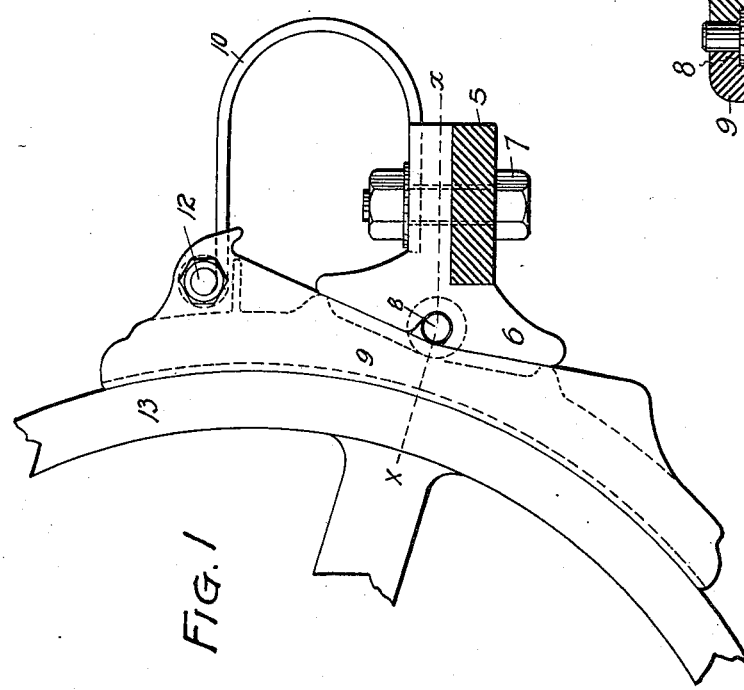
Witnesses
Inventor
H. N. Wood.
By his Attorney

UNITED STATES PATENT OFFICE.

HENRY NEWTON WOOD, OF DENVER, COLORADO.

AUTOMATIC BRAKE-BLOCK.

SPECIFICATION forming part of Letters Patent No. 627,948, dated June 27, 1899.

Application filed January 13, 1899. Serial No. 702,080. (No model.)

*To all whom it may concern:*

Be it known that I, HENRY NEWTON WOOD, a citizen of the United States of America, residing at Denver, in the county of Arapahoe and State of Colorado, have invented certain new and useful Improvements in Automatic Brake-Blocks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in automatic brake-blocks of the class set forth in my previous application, Serial No. 692,039, filed September 27, 1898.

My present invention may be considered an improvement on the construction set forth in said application; and it consists of the features hereinafter described and claimed, all of which may be fully understood by reference to the accompanying drawings, in which is illustrated the embodiment thereof.

In the drawings, Figure 1 is a side elevation of my improved apparatus, the brake-beam being shown in section. Fig. 2 is a rear view of the same. Fig. 3 is a section taken on the line *x x*, Fig. 1.

Similar reference characters indicating corresponding parts in these views, let the numeral 5 designate the brake-beam, to which is secured the wedge 6 by means of bolts 7. This wedge is provided with two faces rearwardly inclined from a central point. In the central front portion of the wedge 6 is journaled an antifrictional roller 8, which engages a groove formed in the adjacent face of the shoe 9, which is also provided with coöperating inclined faces extending parallel with and engaging the faces of the wedge.

The journals of the roller engage open bearings in the wedge, whereby the roller may be readily detached when the shoe is removed.

The bearings in the wedge for the journals of the roller should be made of chilled steel. The shoe is supported in operative relation with the wedge by means of a spring 10, one extremity of which is secured to the wedge by a bolt 7, while the other extremity is connected with the shoe by a bolt 12.

To apply the brake, it is only necessary to shift the brake-beam toward the wheel 13 until the shoe 9 is brought in contact therewith. The brake is then applied automatically by the friction of the wheel, which causes the shoe to move either up or down, according to the direction of the wheel's rotation, whereby the shoe is forced against the wheel by a wedging action. During the brake-setting operation the roller 8 travels in the groove of the brake-shoe. This antifrictional connection diminishes the friction between the wedge and the brake-shoe, while the engagement of the roller with the groove prevents lateral displacement of the shoe.

The spring 10 yields sufficiently to allow the brake-shoe the necessary brake-setting movement. As soon as the shoe is released from the wheel by the reverse movement of the brake-beam the recoil of the spring returns the shoe to its normal position.

It must be understood that I do not limit the invention to the details of construction herein shown, as I am aware that many changes may be made without departing from the spirit of the invention.

Having thus described my invention, what I claim is—

1. The combination with a suitable support arranged to move back and forth in a horizontal plane according as the brake is to be applied or released, of a shoe having two rearwardly-inclined faces, a wedge mounted on the said support and having correspondingly-inclined coöperating faces engaging the faces of the shoe, an antifrictional device mounted on one part and engaging a groove or way formed in the other part, the shoe being movable on the wedge while the latter is relatively stationary and arranged to set the brake when the wheel is turned in either direction, and suitable means for maintaining the shoe in operative relation with the wedge.

2. The combination with a suitable support arranged to move back and forth in a horizontal plane, of a shoe having two rearwardly-inclined faces, a wedge mounted on the said support and having correspondingly-inclined coöperating faces engaging the faces of the shoe, and a roller journaled in one part and engaging a groove formed in the other part, the shoe being movable on the wedge while the latter is relatively stationary.

3. The combination with a suitable brake-beam of a shoe having two rearwardly-inclined faces, of a wedge mounted on the brake-beam and having correspondingly-inclined coöperating faces engaging the faces of the shoe, and a roller journaled in open bearings formed in one part and engaging a groove formed in the other part, the shoe being movable on the wedge while the latter is relatively stationary.

4. The combination with a movable brake-beam, of a wedge made fast thereon, a shoe engaging the wedge and movable thereon, the wedge and the shoe having each two rearwardly-inclined coöperating faces diverging from a central point, one of the said parts being provided with a roller engaging a guide-groove formed in the other part, and suitable means for returning the shoe to its normal position after each braking action.

5. The combination with a movable brake-beam, of a wedge made fast thereon, a shoe engaging the wedge and movable thereon, the wedge and the shoe having each two rearwardly-inclined coöperating faces, one of the said parts being provided with a roller engaging a guide-groove formed in the other part, and suitable means for returning the shoe to the normal position after each braking action, comprising a spring attached to the shoe at one extremity and to the wedge at the opposite extremity.

In testimony whereof I affix my signature in presence of two witnesses.

HENRY NEWTON WOOD.

Witnesses:
 A. J. O'BRIEN,
 NELLIE G. DANIELS.